United States Patent [19]

Nakashita et al.

[11] Patent Number: 5,077,336

[45] Date of Patent: Dec. 31, 1991

[54] LOW-TEMPERATURE INSULATING MATERIAL

[75] Inventors: Takefumi Nakashita; Atsuko Mitsuba, both of Kobe; Daijiro Touji, Kakogawa; Ichiro Tominaga, Kobe; Teruo Sasaki, Nishinomiya; Yukiyasu Nakashio, Kobe; Tsuneyuki Nagase, Takatsuki, all of Japan

[73] Assignee: Sumitomo Rubber Industries, Ltd., Hyogo, Japan

[21] Appl. No.: 254,660

[22] PCT Filed: Jan. 16, 1988

[86] PCT No.: PCT/JP88/00031

§ 371 Date: Nov. 16, 1988

§ 102(e) Date: Nov. 16, 1988

[87] PCT Pub. No.: WO88/05458

PCT Pub. Date: Jul. 28, 1988

[30] Foreign Application Priority Data

Jan. 17, 1987 [JP] Japan ................................ 62-8809
Nov. 5, 1987 [JP] Japan .............................. 62-281360

[51] Int. Cl.$^5$ .......................... C08J 3/205; C08J 5/02; C08K 3/40; C08L 1/28

[52] U.S. Cl. ..................................... 524/732; 524/17; 524/22; 524/28; 524/45; 524/46; 524/47; 524/55; 524/492; 524/704

[58] Field of Search ................. 524/492, 704, 732, 17, 524/22, 28, 45, 46, 47, 55

[56] References Cited

U.S. PATENT DOCUMENTS 4,433,020  2/1984  Narukawa et al. ................ 428/283

FOREIGN PATENT DOCUMENTS 46-19601  6/1971  Japan .
57-36303  8/1982  Japan .

*Primary Examiner*—Thurman K. Page
*Assistant Examiner*—Carlos Azpuru
*Attorney, Agent, or Firm*—Birch, Stewart, Kolasch & Birch

[57] ABSTRACT

The present invention relates to a first low-temperature insulating material which comprises polyvinyl chloride, a plasticizer, a water-containing or absorbing gel or an aqueous solution of a water-soluble polymer and an emulsifier and a second low-temperature insulating material which comprises polyvinyl chloride gelled by mixing with a plasticizer and a surface-covered, water-containing hydrogel. The insulating materials are inexpensive and show excellent heat-insulating properties and excellent flexibility at low temperatures.

12 Claims, No Drawings

LOW-TEMPERATURE INSULATING MATERIAL

FIELD OF THE INVENTION

The present invention relates to low-temperature insulating materials which have excellent flexibility and elasticity at low temperatures.

BACKGROUND OF THE INVENTION

Most of the marketed low-temperature insulating materials utilize gel obtained by adsorbing water in gelatin or water-soluble polymers such as polyvinyl alcohol or polyethylene oxide (see, Japanese Patent Laid Open Publication Nos. 56-36538 and 56-45977). Such gel solidifies too hard at low temperature and lose flexibility at low temperatures. Accordingly, this problem causes an inconvenience when such materials are used as an ice pillow substitute.

Japanese Patent Publication No. 47-18409 discloses oily gels consisting of an unvulcanized elastomeric block copolymer and paraffinic oil. Although flexible, they have a defect of inferior heat-insulating properties.

Japanese Patent Laid Open Publication No. 60-79061 discloses water-containing, water-absorbing cross-linked polymer particles dispersed in a continuous phase consisting of a teleblock copolymer elastomer and oily components, and Japanese Patent Publication No. 60-11738 discloses W/O emulsion obtained by dispersing a water dispersant in a homogeneous dispersing medium containing an oily substance with a high boiling point, natural rubber and synthetic rubber, which is gelled by cross-linking in the presence of a cross-linking agent. Although excellent in heat-insulating properties and flexible at low temperatures, they are associated with complicated processes and high cost. Further, if the amount of water is increased, the mechanical thermal stability will be lost and sometimes water will be found to separate. Moreover, they possess memory effect upon deformation, which is a problem during use.

SUMMARY OF THE INVENTION

The present invention provides low-temperature insulating materials which are inexpensive and have excellent heat-insulating properties and excellent flexibility at low temperatures.

That is, the present invention provides a low-temperature insulating material which comprises (i) polyvinyl chloride, (ii) a plasticizer, (iii) a water-containing or absorbing gel or an aqueous solution of a water-soluble polymer, and (iv) an emulsifier.

Further, the present invention provides a low-temperature insulating material which comprises polyvinyl chloride gelled by mixing with a plasticizer and a surface-covered, water-containing hydrogel.

DETAILED DESCRIPTION OF THE INVENTION

Polyvinyl chloride is an inexpensive industrial material which can be readily obtained. Generally, the average degree of polymerization of polyvinyl chloride is preferably 900–4,000.

As the plasticizer used in the present invention, any one for polyvinyl chloride can be used. Examples of usable plasticizers, includes, for example, di(2-ethylhexyl) phthalate (DOP), dibutyl phthalate (DBP), di(2-ethylhexyl) adipate (DOA), di(2-ethylhexyl) sebacate (DOS), di(2-ethylhexyl) azelate (DOZ), diisodecyl adipate (DIDA), dibutyl sebacate (DBS), epoxydized soybean oil, chlorinated paraffin, a polyester plasticizer and the like. The amount of the plasticizer used is 30–500 parts by weight, preferably 75–200 parts by weight based on 10 parts by weight of polyvinyl chloride. If it exceeds 500 parts by weight, it possesses drawbacks such as deteriorating gel strength. If less than 70 parts by weight, it possesses drawbacks, for example, its fluidity may become worse unless the temperature at ejection is raised.

The water-absorbing gel is a water absorbing high polymer which includes, for example, sodium acrylate polymer, vinyl alcohol - acrylic acid copolymer or isoprene - maleic anhydride copolymer and the like. Instead of the water-absorbing gel, a water-soluble polymer may be used. Examples of such water-soluble polymers includes, for example, carboxymethyl cellulose (CMC), methyl cellulose (MC), polyvinyl alcohol (PVA), sodium alginate, starch, agar, pullulan and the like. The water-absorbing gel or the water-soluble polymer may be added in the low-temperature insulating material as an aqueous solution thereof. The water-absorbing gel may be added in the amount of 0.1–5.5 parts by weight, preferably 0.2–2.0 parts by weight based on 100 parts by weight of water. The water-soluble polymer may be added in the amount of 1.0–5.5 parts by weight, preferably 2.0–3.1 parts by weight based on 100 parts by weight of water. The amount of the water-containing or absorbing gel or the aqueous solution of the water-soluble polymer based on 10 parts by weight of polyvinyl chloride is 50–200 parts by weight, preferably 80–150 parts by weight. When it exceeds 200 parts by weight, it possesses drawbacks, for example, it may become harder when refrigerated, and when below 50 parts by weight, it possesses drawbacks such as reduced heat-insulating quantity.

As the emulsifier, any one which is generally used may be employed. However, nonionic surfactant is preferred to prevent aggregation or precipitation. Examples include glycerol monooleate, sorbitan monooleate, polyethylene glycol oleyl ether and the like. The amount of the emulsifier used based on 10 parts by weight of polyvinyl chloride is 1–25 parts by weight, preferably 7–17 parts by weight. If it exceeds 25 parts by weight, the hardness when refrigerated may disadvantageously increase, and if less than 1 part by weight, it is disadvantageous because water may be readily separated.

A filler or glass powder may be mixed into the low-temperature insulating material of the present invention. The example of such filler includes, for example, calcium carbonate, aluminum oxide, aluminum octylate, mica powder, expanded polyethylene, expanded polystyrene, talc, cork and the like. The example of such glass powder includes, for example, borate glass, silicate glass, phosphate glass and the like. From the viewpoint of the reactivity with a water-soluble polymer, borate glass or a mixture of borate glass and other glass oxide is preferred. The borate glass generally contains $B_2O_3$ as a main ingredient. It may contain other components which do not prevent vitrification, for example, $Al_2O_3$, $K_2O$, $Na_2O$, $CaO$, $MgO$ and the like. Generally, glass oxide may be melted, cooled and subsequently ground before use according to conventional methods. The particle size of the glass powder is not particularly limited, but it is preferably 10–250 $\mu$, desirably 50–150 $\mu$.

The low-temperature insulating material of the present invention may be generally obtained by homogeneously mixing polyvinyl chloride and a plasticizer at 140°-170° C., subsequently compounding a water-containing or absorbing gel or an aqueous solution of a water-soluble polymer, and thoroughly mixing both components in the presence of an emulsifier. Generally, the stirring involves mixing at 70°-100° C. for 1-2 hours followed by thorough mixing homomixer. During the mixing step, other additives, for example, colorants such as pigments, preservatives, UV absorber, antioxidants and the like may be included.

In the second aspect of the present invention, polyvinyl chloride gelled by mixing with a plasticizer and a surface-covered, water-containing hydrogel are compounded. The aforementioned polyvinyl chloride and plasticizer may be used. The plasticizer may be used in 15-45 times, preferably 30-40 times the amount of polyvinyl chloride. When less than 15 times the amount, the elasticity of polyvinyl chloride itself may be heightened, resulting in poor dispersion of a water-containing gel and the like during processing. When it exceeds 45 times the amount, the elasticity of polyvinyl chloride itself may be so decreased that the phases of a water-containing gel and polyvinyl chloride may be disadvantageously separated.

In this description, a water-containing hydrogel means the generally known hydrogel such as starch type hydrogel, acrylic acid type hydrogel, acrylic acid - vinyl alcohol type hydrogel, which is hydrated by adding a proper quantity of water. It is preferable to use it in the amount of 1-8 wt%, especially 5-6 wt% of water, while the hydrogel possesses some remaining water absorption ability. When the amount of water is 1 wt% or smaller, water which is once absorbed in the hydrogel may be disadvantageously released, for example, by external pressure and the like, and when more than 8 wt% of water is present, the water absorption rate of the water-containing hydrogels may disadvantageously become inhomogeneous, resulting in shorter heat-insulating time.

In the present invention, the above water-containing hydrogel, the surface of which is further covered, may be used. In this case, the surface of the covered hydrogel may be cured before use. Without such surface-covering treatment, the water retention material compositions may readily separate and it is difficult to obtain homogeneous compositions.

As such surface-covering agent, protective colloids such as sodium alginate, gelatin, gum arabic, tragacanth gum and high molecular polyhydric alcohol such as polyvinyl alcohol may be used. As the adjuvant to cure them, soap such as calcium, aluminum salt of higher fatty acid, inorganic acid such as hydrochloric acid, sulfuric acid, boric acid or organic acid such as oleic acid, acetic acid and the like may be used. In the surface-covering and curing processes, from half to equal amount of 10-15 wt% aqueous solution of such surface-covering agent is added to the water-containing hydrogel, and the resultant is, directly or after addition of 10-20 wt% of above curative adjuvant, subjected to curing treatment. Water used in the present invention may or may not contain de-icer such as ethylene glycol, or diethylene glycol.

In the second aspect of the present invention, 10-250 parts by weight, preferably 50-150 parts by weight of the surface-covered, water-containing hydrogel based on 100 parts by weight of polyvinyl chloride gelled by mixing with a plasticizer may be compounded. When the compounded amount is not more than 10, the heat-insulating properties may be deteriorated, but good effect can not be expected by compounding 250 and more.

Further, in the present invention, it is preferable to add filler for shape-retention and prevention of flowing when it is not refrigerated, and as such fillers, inorganic oxides, for example, white carbon, talc, titanium oxide, oil-absorbing calcium carbonate and the like, long chain fatty acid salt, especially, calcium stearate, magnesium stearate, aluminum stearate, calcium oleate and the like may be used. They may be used alone or as a mixture of more than two of them. Such fillers may be preferably be the finest particles possible. The amount used is 2-40 wt%, preferably 10-15 wt% of the gelled polyvinyl chloride. When not more than 2 wt%, the shape-retention property and prevention of flowing may be insufficient, and when over 40 wt%, the product is disadvantageously too firm.

The low-temperature insulating materials obtained in the present invention possess sufficient flexibility and elasticity at low temperatures of $-20°$ to $-10°$ C., and further they are free from separation of oil and water. Moreover, it does not have shape-memory upon deformation, and readily resumed to its original shape. In addition, it is sufficiently stable to heating at 70°-100° C. Accordingly, it is very easily handled and excellent in thermal efficiency. Particularly, in the second aspect of the present invention, it doe not lose flexibility after repetition of heating—mechanical deformation, for example, by crumpling—cooling.

EXAMPLE

The present invention will be further illustrated in detail in the following examples.

EXAMPLE 1

Polyvinyl chloride (Sumirit SX-11F manufactured by Sumitomo Chemical Co., Ltd., 10 parts by weight), di(2-ethylhexyl) phthalate (70 parts by weight), di(2-ethylhexyl) adipate (40 parts by weight) were heated to 150° C. while stirring well. The stirring was continued at the same temperature for 30 minutes. To the resultant mixture was added glycerol monooleate (10 parts by weight) and it was cooled to 100° C. when the system became homogeneous by thorough stirring. Subsequently, the above solution of polyvinyl chloride in the plasticizer was added to a solution of carboxymethyl cellulose (4 parts by weight) dissolved in water (100 parts by weight), which had been heated to 90° C., and stirred to give a white gel.

The resultant, after standing overnight at $-20°$ C., did not lose flexibility when deformed by pressing with fingertips and did not lose elasticity to resume its original shape after deformed by fingertip pressure.

EXAMPLE 2

Using polyvinyl chloride (10 parts by weight), dibutyl phthalate (40 parts by weight), di(2-ethylhexyl) phthalate (40 parts by weight), di(2-ethylhexyl) adipate (40 parts by weight), the same operation in Example 1 was repeated, glycerol monooleate (12 parts by weight) was added and stirred, then cooled to 100° C. Polyvinyl alcohol (3 parts by weight), borate glass powder (0.3 parts by weight) were added to water (100 parts by weight), heated and stirred to raise the temperature to 90° C. The above polyvinyl chloride in plasticizer was added to the resultant and stirred to give a white gel.

EXAMPLE 3

In the same manner as in Example 1 using polyvinyl chloride (10 parts by weight), di(2-ethylhexyl) phthalate (89 parts by weight), di(2-ethylhexyl) sebacate (33 parts by weight) and sorbitan monooleate (11 parts by weight) and polyvinyl alcohol (3.3 parts by weight), borate glass powder (0.3 parts by weight), a gel was obtained.

The resultant did not lose flexibility and elasticity after standing at $-20°$ C. overnight.

EXAMPLE 4

Polyvinyl chloride (10 parts by weight), di(2-ethylhexyl) phthalate (100 parts by weight), di(2-ethylhexyl) adipate (37.5 parts by weight) and glycerol monooleate (15 parts by weight) were used and brought into a solution according to the same operation as in Example 1, and calcium carbonate (12.5 parts by weight) was added thereto and stirred to obtain a sufficiently homogeneous solution. The solution was added to a solution of carboxymethyl cellulose (5 parts by weight) in water (125 parts by weight) in the same manner as in Example 1 to give a gel.

This gel also retained flexibility and elasticity after standing overnight at $-20°$ C.

EXAMPLE 5

Di(2-ethylhexyl) phthalate (58 parts by weight) and di(2-ethylhexyl) adipate (33 parts by weight) were added to polyvinyl chloride (10 parts by weight), heated to 150° C. to effect sufficient dissolution. Then, glycerol monooleate (8 parts by weight) was added. Separately, isoprene-maleic anhydride copolymer (KI gel-201, K-F2 manufactured by Kuraray Isoprene Chemical, 1.7 parts by weight) had been hydrated with water (83 parts by weight), which was stirred while gradually poured into the above polyvinyl chloride solution at 95° C.

The gel removed after thorough stirring was a low-temperature insulating material having sufficient flexibility and elasticity after standing overnight at $-20°$ C.

EXAMPLE 6

Di(2-ethylhexyl) phthalate (80 parts by weight) and di(2-ethylhexyl) adipate (30 parts by weight) were added to polyvinyl chloride (10 parts by weight), heated to 150° C. and, after thoroughly dissolved, glycerin monooleate (10 parts by weight) was added thereto. Separately, vinyl alcohol-acrylic acid copolymer (Sumica gel SP-520 manufactured by Sumitomo Chemical Co., Ltd., 2 parts by weight) containing water (100 parts by weight) was prepared, to which was gradually added the above polyvinyl chloride in plasticizer with stirring at 95° C.

The gel removed after thorough stirring was a low-temperature insulating material having sufficient flexibility and elasticity after standing overnight at $-20°$ C.

EXAMPLE 7

Hydrogel (S-50, manufactured by Sumitomo Chemical Co., Ltd, 20 g) and water (370 g) were completely mixed to hydrate, to which was added a solution of sodium alginate (10 g) in water (200 g) The resultant was stirred, calcium stearate (20 g). The was added thereto and stirred (step I). Separately, polyvinyl chloride (PX-QHH, manufactured by Sumitomo Chemical Co., Ltd., 15 g) and dioctyl phthalate (DOP) (450 g), dioctyl adipate (DOA) (100 g) were mixed, heated to 140° C. and well-stirred (step II). The composition obtained in the step II was added to the composition obtained in the step I and well stirred. The resulting low-temperature insulating material possessed enough flexibility after cooling at $-20°$ C. to fit the affected part and never cured under repeated usage. Then, the product which had been cooled to $-20°$ C. was heated with boiling water for 15 minutes, crumpled, then refrigerated again at $-20°$ C. The operation was repeated. Similarly, a water-containing hydrogel without surface-cover was prepared and the above operation was repeated. The surface-covered product did not cure after the operation was repeated 15 times, but the surface-uncovered product cured after operations was repeated twice.

EXAMPLE 8

The product heated in step II in Example 7 was further stirred with talc powder (30 g) and the same operation was repeated. The resulting low-temperature insulating material possessed enough flexibility to fit the affected part after cooling at $-20°$ C. and never cured under repeated usage. Moreover, good result was obtained in retention of shape and prevention of fluidization when not refrigerated. Then, the product cooled at $-20°$ C. was heated with boiling water for 15 minutes, crumpled and refrigerated again at $-20°$ C., and the operation was repeated. Similarly, surface-uncovered water-containing hydrogel was prepared and the above operation was repeated. The surface-covered product did not cure after the operation was repeated 15 times while the surface-uncovered product cured after the operation was repeated twice.

EXAMPLE 9

In the operation in Example 7, polyvinyl alcohol (10 g), which was dissolved in boiling water (200 g) and cross-linked with borate glass (1 g), was used instead of sodium alginate. The resulting low-temperature insulating material retained flexibility to fit the affected part after cooling at $-20°$ C. like that of Example 6. Then, the product cooled at $-20°$ C. was heated with boiling water for 15 minutes, crumpled and refrigerated again at $-20°$ C., and the operation was repeated. Similarly, surface-uncovered, water-containing hydrogel was prepared and the above operation was repeated. The surface-covered product did not cure after the operation was repeated 15 times, while the surface-uncovered product cured after the operation was repeated twice.

EXAMPLE 10

In the same operation as in Example 8, white carbon dust was used instead of talc to give a flexible low-temperature insulating material which was sufficiently flexible to fit the affected part at $-20°$ C. analogous to Example 6. Then, the product cooled at $-20°$ C. was heated with boiling water for 15 minutes, crumpled and refrigerated again at $-20°$ C. The operation was repeated. Similarly, surface-uncovered, water-containing hydrogel was prepared and the above operation was repeated. The surface-covered product did not cure after the operation was repeated 15 times, while the surface-uncovered product cured after the operation was repeated twice.

REFERENCE EXAMPLE 1

The sample was prepared according to Example 1 in Japanese Patent Publication No. 60-11738.

REFERENCE EXAMPLE 2

Carboxymethyl cellulose (30 parts by weight) and water (500 parts by weight) were thoroughly stirred at 70° C. to give a water-containing gel.

EXPERIMENT

Among the above examples, Examples 2, 4, 5 and 7-10, and Reference Examples 1 and 2 were examined for low-temperature insulating time, flexibility when refrigerated, separation of oil and water, and shape memory. The results are shown in Table 1.

TABLE 1

| | Low-temperature[1] Insulating Time (hr) | Flexibility[2] when refrigerated | Separation[3] of oil and water | Shape Memory[4] |
|---|---|---|---|---|
| Ex.2 | 6.5 | o | o | o |
| Ex.4 | 7.0 | Δ | o | o |
| Ex.5 | 6.0 | o | o | o |
| Ex.7 | 6.8 | o | o | o |
| Ex.8 | 7.0 | o | o | o |
| Ex.9 | 6.5 | o | o | o |
| Ex.10 | 6.5 | o | o | o |
| Ref.Ex.1 | 6.2 | o | x | x |
| Ref.Ex.2 | 7.5 | x | o | o |

[1] The samples refrigerated at −20° C. for 15 hours were left in a chamber at 22° C. and the time required for temperature to rise to +10° C. was determined. The samples of the size about 250 mm × 200 mm × 35 mm were used.
[2] The conditions of the samples which had been refrigerated at −20° C. for 15 hours were observed when pressed with fingers.
o: Easily indented
Δ: Indented when pressed intensively
x: Not indented
[3] The operation wherein the sample was refrigerated at −20° C. for 15 hours, subsequently brought back to +22° C. was repeated ten times, and the separation of oil and water was observed. and the separation of oil and water was examined.
x: Separation was observed.
o: No separation was observed.
[4] The bagged low-temperature insulating material was observed when folded in two and unfolded after standing for a week.
x: The sample did not return to its original plane-shape as it memorized the folded-shape.
o: The sample easily returned to plane.

We claim:

1. A low-temperature insulating material, which comprises a solution of:
   (i) polyvinyl chloride,
   (ii) 30-500 parts by weight of a plasticizer,
   (iii) 50-200 parts by weight of a water-containing or absorbing gel or an aqueous solution of a water-soluble polymer, and
   (iv) 1-25 parts by weight of an emulsifier based on 10 parts by weight of (i) polyvinyl chloride.

2. The low-temperature insulating material according to claim 1, which further contains a filler or glass powder.

3. A process for preparing the low-temperature insulating material according to claim 1, which comprises:
   mixing homogeneously polyvinyl chloride and a plasticizer at 140°-170° C.,
   compounding a water-containing or absorbing gel or an aqueous solution of a water-soluble polymer, and
   mixing in the presence of an emulsifier.

4. The low-temperature insulating material of claim 1 which comprises polyvinyl chloride gelled by mixing with a plasticizer and a surface-covered, water containing hydrogel, wherein the water-containing hydrogel is an absorbing gel selected from the group consisting of sodium acrylate polymer, vinyl-alcohol-acrylic acid copolymer, and isoprene-maleic anhydride copolymer, or a water-soluble polymer selected from the group consisting of carboxymethyl cellulose, methyl cellulose, polyvinyl alcohol, sodium alginate, starch, agar and pullulan, and the water-containing hydrogel is surface-covered with a protective colloid or a high molecular weight polyhydric alcohol.

5. The low-temperature insulating material according to claim 4, which was surface-covered with protective colloids or polymeric polyhydric alcohol.

6. The low-temperature insulating material according to claim 4, which comprises 10-250 parts by weight of the surface-covered, water-containing hydrogel based on 100 parts by weight of polyvinyl chloride gelled by mixing with a plasticizer.

7. The low-temperature insulating material according to claim 1, wherein the plasticizer is selected from the group consisting of di (2-ethylhexyl) phthalate, dibutyl phthalate, di (2-ethylhexyl) adipate, di(2-ethylhexyl) sebacate, di (2-ethylhexyl) azelate, diisodecyl adipate, dibutyl sebacate, epoxydized soybean oil, chlorinated paraffin, and a polyester plasticizer.

8. The low-temperature insulating material according to claim 1, wherein the absorbing gel is selected from the group consisting of sodium acrylate polymer, vinyl alcohol-acrylic acid copolymer, and isoprene-maleic anhydride copolymer.

9. The low-temperature insulating material according to claim 1, wherein the water-soluble polymer is selected from the group consisting of carboxymethyl cellulose, methyl cellulose, polyvinyl alcohol, sodium alginate, starch, agar, and pullulan.

10. The low-temperature insulating material according to claim 1, wherein the emulsifier is a nonionic surfactant.

11. The low-temperature insulating material according to claim 10, wherein the nonionic surfactant is selected from the group consisting of glycerol monooleate, sorbitan monooleate, and polyethylene glycol oleyl ether.

12. The low-temperature insulating material according to claim 4, wherein the plasticizer is present in an amount of 15 to 45 times the amount of polyvinyl chloride.

* * * * *